US006976538B2

(12) United States Patent
Wilson et al.

(10) Patent No.: US 6,976,538 B2
(45) Date of Patent: Dec. 20, 2005

(54) METHODS AND HIGH DENSITY VISCOUS SALT WATER FLUIDS FOR TREATING SUBTERRANEAN ZONES

(75) Inventors: J. Michael Wilson, Duncan, OK (US); Robert E. Hanes, Jr., Duncan, OK (US); Bradley L. Todd, Duncan, OK (US); Keith A. Frost, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 259 days.

(21) Appl. No.: 10/630,276

(22) Filed: Jul. 30, 2003

(65) Prior Publication Data

US 2005/0022993 A1 Feb. 3, 2005

(51) Int. Cl.⁷ .................... E21B 43/267; E21B 43/04
(52) U.S. Cl. .................. 166/300; 166/278; 166/280.1; 166/308.5; 507/209; 507/211; 507/213; 507/214; 507/267; 507/273

(58) Field of Search ................... 166/276, 278, 166/280.1, 283, 300, 308.2, 308.3, 308.5; 507/267, 276, 277, 273, 209, 211, 213, 214

(56) References Cited

U.S. PATENT DOCUMENTS

| 5,204,183 A | * | 4/1993 | McDougall et al. ... 428/402.24 |
| 5,609,207 A | * | 3/1997 | Dewprashad et al. ....... 166/276 |
| 6,722,434 B2 | * | 4/2004 | Reddy et al. ............... 166/292 |
| 6,810,959 B1 | * | 11/2004 | Qu et al. .................... 166/300 |

* cited by examiner

*Primary Examiner*—Zakiya Walker
(74) *Attorney, Agent, or Firm*—Robert A. Kent; Baker Botts

(57) ABSTRACT

Methods of treating subterranean zones and high density viscous aqueous treating fluids are provided. A high density viscous aqueous treating fluid of the invention comprises salt water comprising water and one or more oxidation resistant salts; a gelling agent; and a delayed oxidizing gel breaker.

23 Claims, No Drawings

METHODS AND HIGH DENSITY VISCOUS SALT WATER FLUIDS FOR TREATING SUBTERRANEAN ZONES

BACKGROUND OF THE INVENTION

1. Field of the Invention

The present invention relates to methods of treating subterranean zones using high density viscous salt water treating fluids.

2. Description of the Prior Art

High density viscous salt water treating fluids are often used in operations and treatments conducted in oil and gas wells. Such operations and treatments include, but are not limited to, well completion operations and production stimulation treatments.

An example of a well completion operation in which a high density viscous salt water treating fluid is often used is gravel packing. In gravel packing operations, particulate material referred to in the art as gravel, is carried to a subterranean zone in which a gravel pack is to be placed by a viscous treating fluid. That is, particulate material such as sand is suspended in the viscous treating fluid at the surface and carried to the subterranean zone in which a gravel pack is to be placed. Once the particulate material utilized is placed in the zone, the viscous treating fluid breaks into a low viscosity fluid. The gravel pack produced functions as a filter to separate formation solids from produced fluids while permitting the produced fluids to flow into and through the well bore.

An example of a production stimulation treatment in which a high density viscous salt water treating fluid can be used is hydraulic fracturing. That is, a viscous treating fluid referred to in the art as a fracturing fluid, is pumped through the well bore into a subterranean zone to be stimulated at a rate and pressure such that fractures are formed and extended in the subterranean zone. At least a portion of the fracturing fluid carries particulate material such as sand, referred to in the art as proppant, into the formed fractures. The proppant is suspended in the viscous aqueous fracturing fluid so that the proppant is deposited in the fractures when the pumping stops and the fractures close onto the proppant. The proppant functions to prevent the formed fractures from completely closing whereby conductive channels are formed through which produced fluids can flow to the well bore.

In the completion or stimulation of oil and gas wells and particularly in off shore wells having relatively low temperatures, i.e., temperatures in the range of from about 80° F. to about 140° F., high density viscous salt water treating fluids having densities in the range of from about 9 lbs/gal to about 15 lbs/gal are often required for well control purposes. In addition, the viscous salt water treating fluid must maintain viscosity for at least about two to three hours and must be completely broken in a few days. Because of the low temperatures and the high salt concentrations in the high density viscous salt water treating fluids utilized heretofore, the oxidizing viscosity breakers utilized have often failed to completely break the salt water treating fluid viscosities in the required times. Thus, there are continuing needs for improved high density viscous salt water treating fluids that break, i.e., are reduced to low viscosity fluids, in relatively short periods of time at low temperatures. The time required, either a matter of hours or days, will depend on the treatment design.

SUMMARY OF THE INVENTION

The present invention provides improved methods of treating subterranean zones and high density viscous salt water treating fluids that meet the needs described above and overcome the deficiencies of the prior art. In accordance with the present invention, improved methods of treating subterranean zones using high density viscous salt water treating fluids are provided that maintain sufficient viscosity for a period of time, but eventually break in the time required by the treatment design.

The methods of the present invention for treating a subterranean zone penetrated by a well bore comprise the following steps. A high density viscous salt water treating fluid having a density in the range of from about 9 lbs/gal to about 15 lbs/gal is prepared or provided comprising salt water, a gelling agent and a delayed oxidizing gel breaker. The salt water comprises water and one or more oxidation resistant salts. The viscous salt water treating fluid is introduced into the subterranean zone and allowed to break into a low viscosity fluid.

Examples of the one or more oxidation resistant salts that can be utilized in accordance with this invention include, but are not limited to, calcium, potassium, cesium or sodium acetate; potassium, cesium or sodium citrate; potassium, cesium or sodium nitrate; and potassium, cesium or sodium formate.

A high density viscous salt water treating fluid of this invention for treating subterranean zones having a density in the range of from about 9 lbs/gal to about 15 lbs/gal comprises salt water, a gelling agent and a delayed oxidizing gel breaker. The salt water comprises water and one or more oxidation resistant salts selected from the group set forth above.

The objects, features and advantages of the present invention will be readily apparent to those skilled in the art upon a reading of the description of preferred embodiments which follows.

DESCRIPTION OF PREFERRED EMBODIMENTS

The present invention provides methods of treating subterranean zones penetrated by well bores utilizing high density viscous salt water treating fluids having densities in the range of from about 9 lbs/gal to about 15 lbs/gal. The methods and treating fluids are particularly useful for treating subterranean zones having temperatures in the range of from about 80° F. to about 140° F. High density salt water treating fluids have heretofore been utilized for carrying out gravel packing or fracturing treatments in subterranean zones penetrated by well bores. However, when a high density viscous salt water treating fluid having a density in the range of from about 9 lbs/gal to about 15 lbs/gal is utilized, the viscous salt water treating fluid has been difficult to break using delayed oxidizing gel breakers in a relatively short period of time after the required delay period, e.g., a time period less than three days. It has now been discovered that the salts utilized heretofore have been oxidized by the oxidizing gel breaker along with the gelling agent in the high density viscous salt water treating fluid whereby the viscosity of the treating fluid is only partially reduced in a time period of about three days. Examples of the one or more salts heretofore used include calcium, potassium or sodium chloride, bromide, and the like. In accordance with the present invention, the salts utilized to form the high density salt water are oxidation resistant salts. Examples of such salts include, but are not limited to, calcium, potassium, cesium or sodium acetate; potassium, cesium or sodium citrate; potassium, cesium or sodium nitrate; and potassium, cesium or sodium formate. The presence of one or more oxidization resistant salts in the salt water of the high density viscous salt water treating fluids of this invention allows the oxidizing gel breakers used to completely break the treating fluids in less than about three days.

A method of the present invention for treating a subterranean zone penetrated by a well bore comprises the following steps. A high density viscous salt water treating fluid having a density in the range of from about 9 lbs/gal to about 15 lbs/gal is prepared or provided. The treating fluid comprises salt water, a gelling agent and a delayed oxidizing gel breaker. The salt water comprises water and one or more oxidation resistant salts. The viscous salt water treating fluid is introduced into the subterranean zone and allowed to break into a low viscosity fluid.

A high density viscous salt water treating fluid of this invention having a density in the range of from about 9 lbs/gal to about 15 lbs/gal comprises salt water, a gelling agent and a delayed oxidizing gel breaker. The salt water comprises water and one or more oxidation resistant salts.

The one or more oxidation resistant salts included in the salt water treating fluid of this invention allow the delayed oxidizing gel breaker to reduce the viscous treating fluid to a low viscosity fluid without being partially consumed by reaction with the salts in the salt water. This in turn allows the viscous treating fluid to break within a relatively short period of time, i.e., in less than one day or at most in less than about three days. Of the various oxidation resistant salts that can be utilized, sodium nitrate is generally preferred.

The gelling agent in the high viscosity viscous salt water treating fluid of this invention functions to increase the viscosity of the fluid. Examples of gelling agents that can be used include, but are not limited to, guar gum and its derivatives, cellulose derivatives, welan gum, xanthan biopolymer, and succinoglycon biopolymer. Of these, xanthan biopolymer is preferred. The gelling agent is generally present in the treating fluid in an amount in the range of from about 0.05% to about 2% by weight of the salt water therein, more preferably in an amount of about 0.5%.

A variety of delayed oxidizing gel breakers can be utilized in accordance with the present invention. Examples of particularly suitable delayed oxidizing gel breakers include, but are not limited to, potassium, ammonium or sodium persulfate; potassium, ammonium or sodium perborate; potassium, ammonium or sodium bromate; potassium, ammonium or sodium periodate; potassium, ammonium or sodium chlorate; and potassium, ammonium or sodium chlorite. Of these, sodium persulfate is preferred. The delayed oxidizing gel breaker is utilized in the treating fluid in an amount in the range of from about 0.1% to about 5% by weight of the salt water therein, more preferably in an amount of about 2%.

If the viscosity of the treating fluid containing a gelling agent as described above is not sufficient, a cross-linking agent for the gelling agent can be added to the treating fluid to increase its viscosity. Examples of cross-linking agents that can be utilized include, but are not limited to, borate releasing compounds, a source of titanium ions, a source of zirconium ions, a source of antimony ions, and a source of aluminum ions. Of these, a borate releasing compound is preferred. When used, the cross-linking agent is included in the treating fluid in an amount in the range of from about 0.025% to about 1% by weight of salt water therein, more preferably in an amount of about 0.05%.

A method of this invention for treating a subterranean zone penetrated by a well bore whereby a gravel pack is formed therein by placing particulate gravel material in the well bore adjacent to the subterranean zone is comprised of the following steps. A high density viscous salt water carrier fluid having a density in the range of from about 9 lbs/gal to about 15 lbs/gal is prepared or provided. The carrier fluid comprises salt water, xanthan biopolymer gelling agent, a delayed oxidizing gel breaker and suspended particulate gravel material. The salt water comprises water and one or more oxidation resistant salts such as calcium, potassium, cesium or sodium acetate; potassium, cesium or sodium citrate; potassium, cesium or sodium nitrate; and calcium, potassium, cesium or sodium formate. The carrier fluid is introduced into the subterranean zone and allowed to break into a low viscosity fluid whereby the particulate gravel material is deposited in the subterranean zone and/or for the purpose of removing the treating fluid.

The oxidation resistant salt in the carrier fluid is preferably sodium nitrate. The xanthan gelling agent is present in the treating fluid in an amount in the range of from about 0.05% to about 2% by weight of the salt water therein. The oxidizing gel breaker is preferably sodium persulfate. The oxidizing gel breaker is present in the treating fluid in an amount in the range of from about 0.01% to about 5% by weight of the salt water therein.

A method of this invention for treating a subterranean zone penetrated by a well bore by fracturing the zone and depositing particulate proppant material in the fractures formed is comprised of the following steps. A high density viscous salt water fracturing fluid having a density in the range of from about 9 lbs/gal to about 15 lbs/gal is prepared or provided. The fracturing fluid comprises salt water, xanthan biopolymer gelling agent, a delayed oxidizing gel breaker and suspended particulate proppant material. The salt water comprises water and one or more oxidation resistant salts such as calcium, potassium, cesium or sodium acetate; potassium, cesium or sodium citrate; potassium, cesium or sodium nitrate; and calcium, potassium, cesium or sodium formate. The viscous salt water fracturing fluid is introduced into the subterranean zone at a rate and pressure sufficient to fracture the subterranean zone and the viscous salt water fracturing fluid is allowed to break into a low viscosity fluid.

The oxidation resistant salt in the fracturing fluid is preferably sodium nitrate. The xanthan gelling agent is present in the treating fluid in an amount in the range of from about 0.05% to about 2% by weight of the salt water therein. The delayed oxidizing gel breaker is preferably sodium persulfate. The delayed oxidizing gel breaker is present in the treating fluid in an amount in the range of from about 0.01% to about 5% by weight of the salt water therein.

A preferred method for treating a subterranean zone penetrated by a well bore comprises the steps of: (a) preparing or providing a high density viscous salt water treating fluid having a density in the range of from about 9 lbs/gal to about 15 lbs/gal that comprises salt water, a gelling agent and a delayed oxidizing gel breaker, the salt water comprising water and one or more oxidation resistant salts; (b) introducing the high density viscous salt water treating fluid into the subterranean zone; and (c) allowing the high density viscous cross-linked salt water treating fluid to break into a low viscosity fluid.

A preferred method of treating a subterranean zone penetrated by a well bore by placing particulate gravel material therein comprises the steps of: (a) preparing or providing a high density viscous salt water carrier fluid having a density in the range of from about 9 lbs/gal to about 15 lbs/gal that comprises salt water, xanthan biopolymer gelling agent, a delayed oxidizing gel breaker and suspended particulate gravel material, the salt water comprising water and one or more oxidation resistant salts; (b) introducing the high density viscous salt water carrier fluid into the subterranean zone; and (c) allowing the high density viscous salt water carrier fluid to break into a low viscosity fluid whereby the particulate gravel material is deposited in the subterranean zone.

A preferred method of treating a subterranean zone penetrated by a well bore by fracturing the zone and depositing particulate proppant material in the fractures formed comprises the steps of: (a) preparing or providing a high density viscous salt water fracturing fluid having a density in the range of from about 9 lbs/gal to about 15 lbs/gal that comprises salt water, xanthan biopolymer gelling agent, a delayed oxidizing gel breaker and suspended particulate proppant material, the salt water comprising water and one or more oxidation resistant salts; (b) introducing the high density viscous salt water fracturing fluid into the subterranean zone at a rate and pressure sufficient to fracture the subterranean zone; and (c) allowing the high density viscous salt water fracturing fluid to break into a low viscosity fluid.

A preferred viscous salt water treating fluid for treating subterranean zones having a density in the range of from about 9 lbs/gal to about 15 lbs/gal that comprises: salt water comprising water and one or more oxidation resistant salts; a gelling agent; and a delayed oxidizing breaker.

In order to further illustrate the methods and aqueous treating fluids of the present invention, the following examples are given.

EXAMPLE 1

A mixture of 200 lbs/1000 gal of sodium persulfate oxidizing gel breaker and 100 lbs/1000 gal of reducing sugar activator was added to an 8.7 lbs/gal potassium chloride salt solution containing xanthan gelling agent in an amount of 60 lbs/1000 gal. The sodium persulfate oxidizing gel breaker reduced the viscosity of the salt solution to about 47 centipoises in one hour and to about 12.5 centipoises in two days.

When the same amounts of the same sodium persulfate gel breaker and reducing sugar activator were added to a 9.7 lbs/gal potassium chloride and sodium bromide salt solution containing the same amount of xanthan gelling agent and having the same viscosity, the viscosity of the salt solution was only reduced to 53 centipoises in one hour and 33 centipoises in three days. Thus, it became clear that the gel breaker was oxidizing the salts as well as the gelling agent.

EXAMPLE 2

A mixture of 200 lbs/1000 gal of sodium persulfate oxidizing gel breaker and 100 lbs/1000 gal of reducing sugar activator was added to a 9.7 lbs/gal sodium nitrate salt solution containing xanthan gelling agent in an amount of 60 lbs/1000 gal. The sodium persulfate oxidizing gel breaker reduced the viscosity of the salt solution to 24 centipoises in one day and to 4 centipoises in three days.

Thus, the oxidation resistant salts utilized in accordance with this invention allow the oxidizing gel breaker to more rapidly oxidize the gelling agent utilized and reduce the viscosity of the salt solution.

The present invention is well adapted to carry out the objects and attain the ends and advantages mentioned as well as those which are inherent therein. While numerous changes can be made by those skilled in the art, such changes are encompassed within the spirit of this invention as defined by the appended claims.

What is claimed is:

1. A method of treating a subterranean zone penetrated by a well bore comprising the steps of:
   (a) preparing or providing a high density viscous salt water treating fluid having a density in the range of from about 9 lbs/gal to about 15 lbs/gal that comprises salt water, a gelling agent and a delayed oxidizing gel breaker, said salt water comprising water and one or more oxidation resistant salts;
   (b) introducing said high density viscous salt water treating fluid into said subterranean zone; and
   (c) allowing said high density viscous salt water treating fluid to break into a low viscosity fluid.

2. The method of claim 1 wherein said one or more oxidation resistant salts are selected from the group consisting of calcium, potassium, cesium or sodium acetate; potassium, cesium or sodium citrate; potassium, cesium or sodium nitrate; and potassium, cesium or sodium formate.

3. The method of claim 1 wherein said oxidation resistant salt is sodium nitrate.

4. The method of claim 1 wherein said gelling agent is selected from the group consisting of guar gum and its derivatives, cellulose derivatives, welan gum, xanthan biopolymer and succinoglycon biopolymer.

5. The method of claim 1 wherein said gelling agent is xanthan biopolymer.

6. The method of claim 1 wherein said gelling agent is present in said treating fluid in an amount in the range of from about 0.05% to about 2% by weight of said salt water therein.

7. The method of claim 1 wherein said delayed oxidizing gel breaker is selected from the group consisting of potassium, ammonium or sodium persulfate; potassium, ammonium or sodium perborate; potassium, ammonium or sodium bromate; potassium, ammonium or sodium periodate; potassium, ammonium or sodium chlorate; and potassium, ammonium or sodium chlorite.

8. The method of claim 1 wherein said delayed oxidizing gel breaker is sodium persulfate.

9. The method of claim 1 wherein said delayed oxidizing gel breaker is present in said treating fluid in an amount in the range of from about 0.01% to about 5% by weight of said salt water therein.

10. The method of claim 1 which further comprises a cross-linking agent for cross-linking said gelling agent and thereby increasing the viscosity of said treating fluid.

11. The method of claim 10 wherein said cross-linking agent is selected from the group consisting of borate releasing compounds, a source of titanium ions, a source of zirconium ions, a source of antimony ions, and a source of aluminum ions.

12. The method of claim 10 wherein said cross-linking agent is a borate releasing compound.

13. The method of claim 10 wherein said cross-linking agent is present in said treating fluid in an amount in the range of from about 0.025% to about 1% by weight of said salt water therein.

14. A method of treating a subterranean zone penetrated by a well bore by placing particulate gravel material therein comprising the steps of:
   (a) preparing or providing a high density viscous salt water carrier fluid having a density in the range of from about 9 lbs/gal to about 15 lbs/gal that comprises salt water, xanthan biopolymer gelling agent, a delayed oxidizing gel breaker and suspended particulate gravel material, said salt water comprising water and one or more oxidation resistant salts;

(b) introducing said high density viscous salt water carrier fluid into said subterranean zone; and (c) allowing said high density viscous salt water carrier fluid to break into a low viscosity fluid whereby said particulate gravel material is deposited in said subterranean zone.

15. The method of claim 14 wherein said oxidizing resistant salt is sodium nitrate.

16. The method of claim 14 wherein said gelling agent is present in said treating fluid in an amount in the range of from about 0.05% to about 2% by weight of said salt water therein.

17. The method of claim 14 wherein said delayed oxidizing gel breaker is sodium persulfate.

18. The method of claim 14 wherein said delayed oxidizing gel breaker is present in said treating fluid in an amount in the range of from about 0.01% to about 5% by weight of said salt water therein.

19. A method of treating a subterranean zone penetrated by a well bore by fracturing the zone and depositing particulate proppant material in the fractures formed comprising the steps of:

(a) preparing or providing a high density viscous salt water fracturing fluid having a density in the range of from about 9 lbs/gal to about 15 lbs/gal that comprises salt water, xanthan biopolymer gelling agent, a delayed oxidizing gel breaker and suspended particulate proppant material; said salt water comprising water and one or more oxidation resistant salts;

(b) introducing said high density viscous salt water fracturing fluid into said subterranean zone at a rate and pressure sufficient to fracture said subterranean zone; and (c) allowing said high density viscous salt water fracturing fluid to break into a low viscosity fluid.

20. The method of claim 19 wherein said oxidization resistant salt is sodium nitrate.

21. The method of claim 19 wherein said gelling agent is present in said treating fluid in an amount in the range of from about 0.05% to about 2% by weight of said salt water therein.

22. The method of claim 19 wherein said delayed oxidizing gel breaker is sodium persulfate.

23. The method of claim 19 wherein said delayed oxidizing gel breaker is present in said treating fluid in an amount in the range of from about 0.01% to about 5% by weight of said salt water therein.

* * * * *